July 21, 1925.
C. A. NERACHER
1,547,157
MOTOR CYCLE
Filed June 27, 1921
9 Sheets-Sheet 1
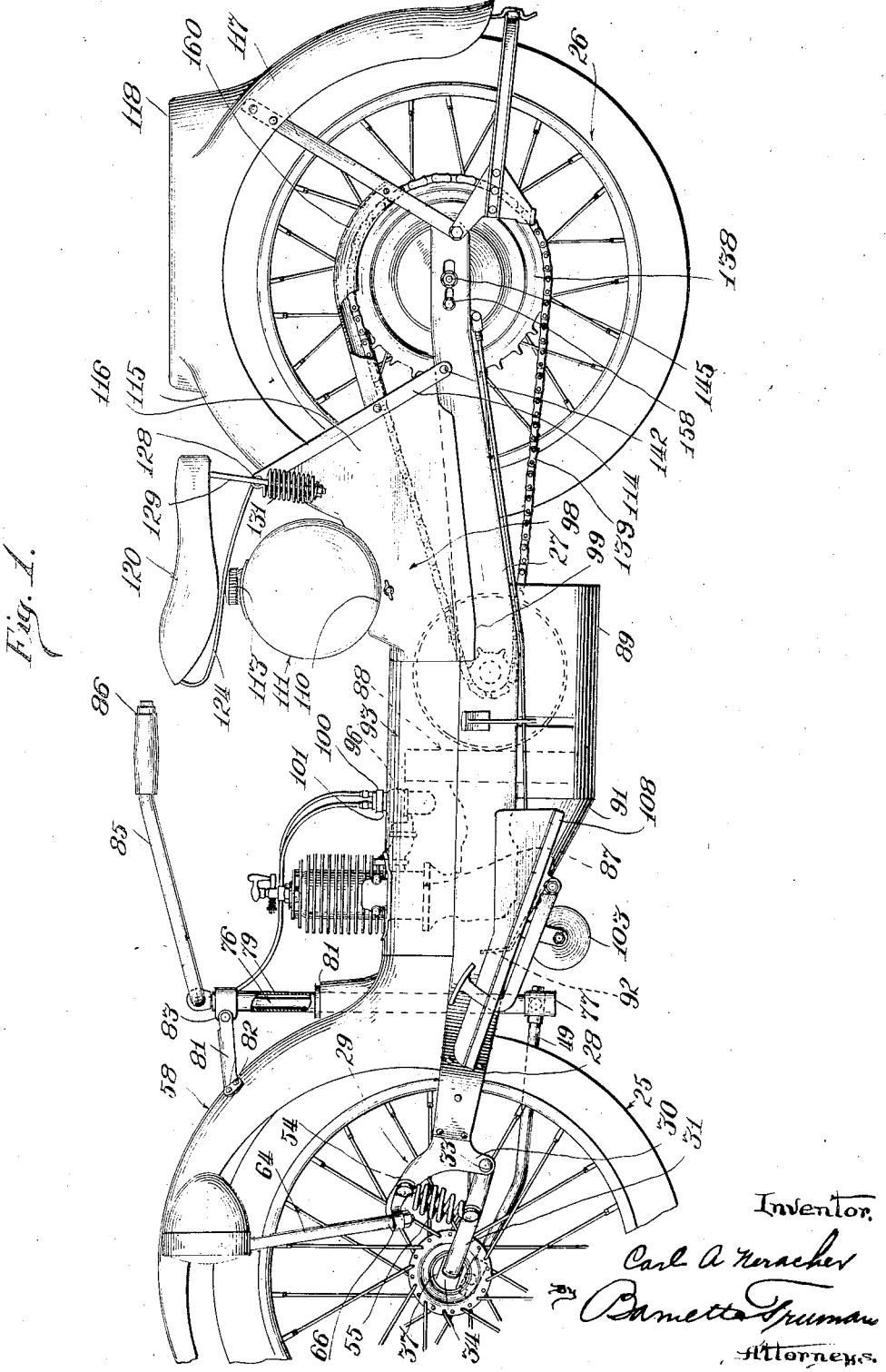
Inventor.
Carl A. Neracher
Barnett Truman
Attorneys.

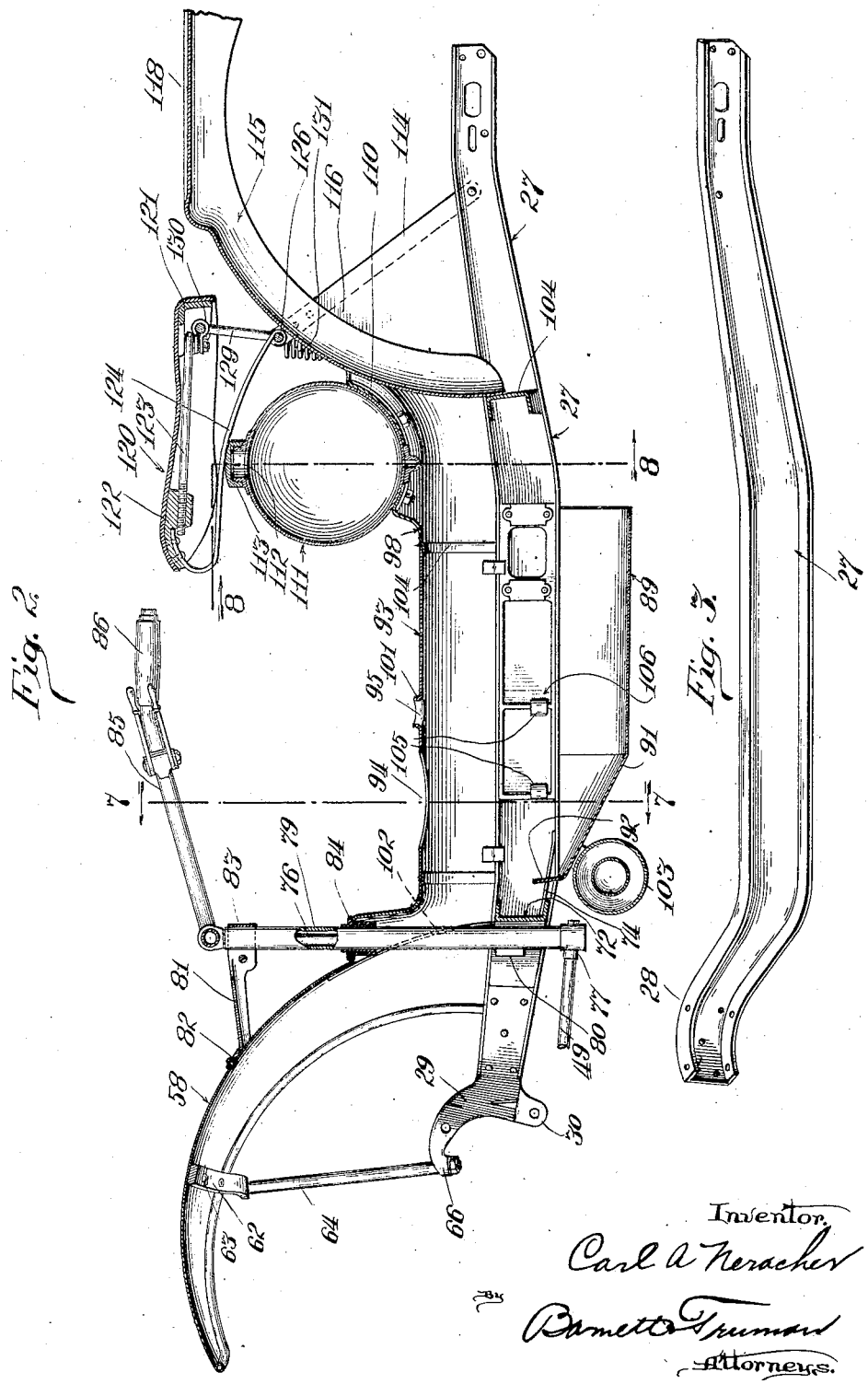

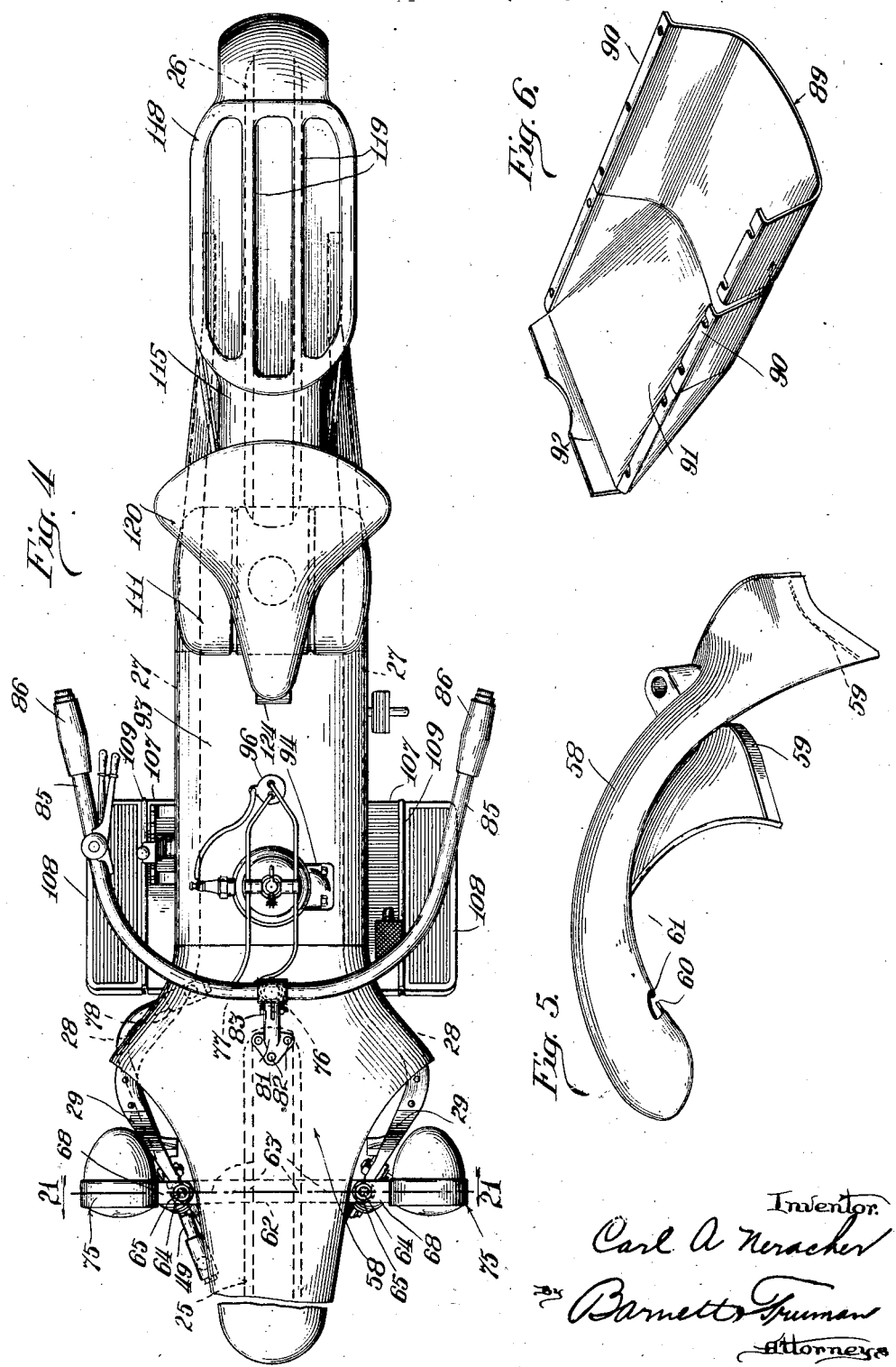

July 21, 1925.
C. A. NERACHER
1,547,157
MOTOR CYCLE
Filed June 27, 1921 9 Sheets-Sheet 4
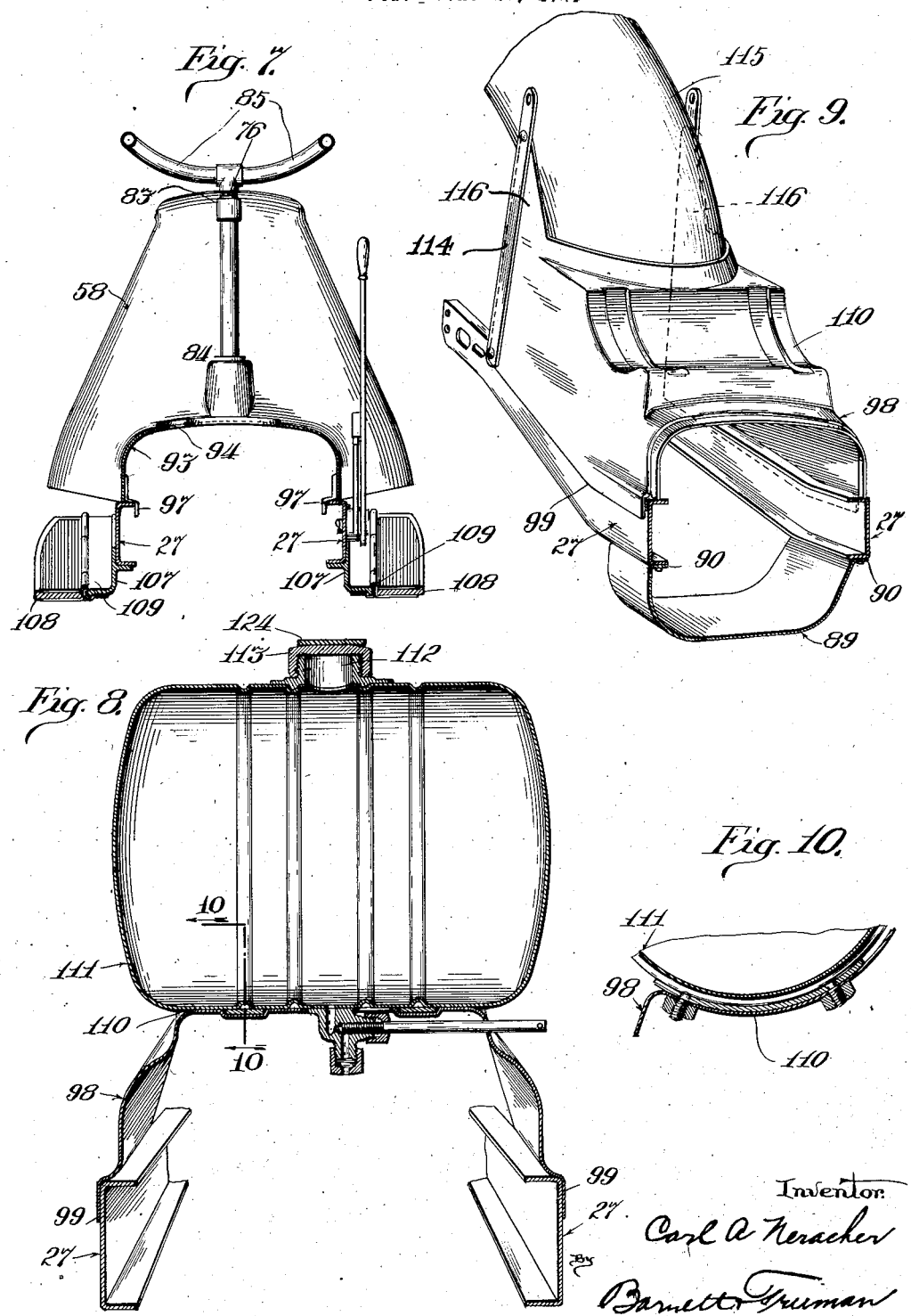

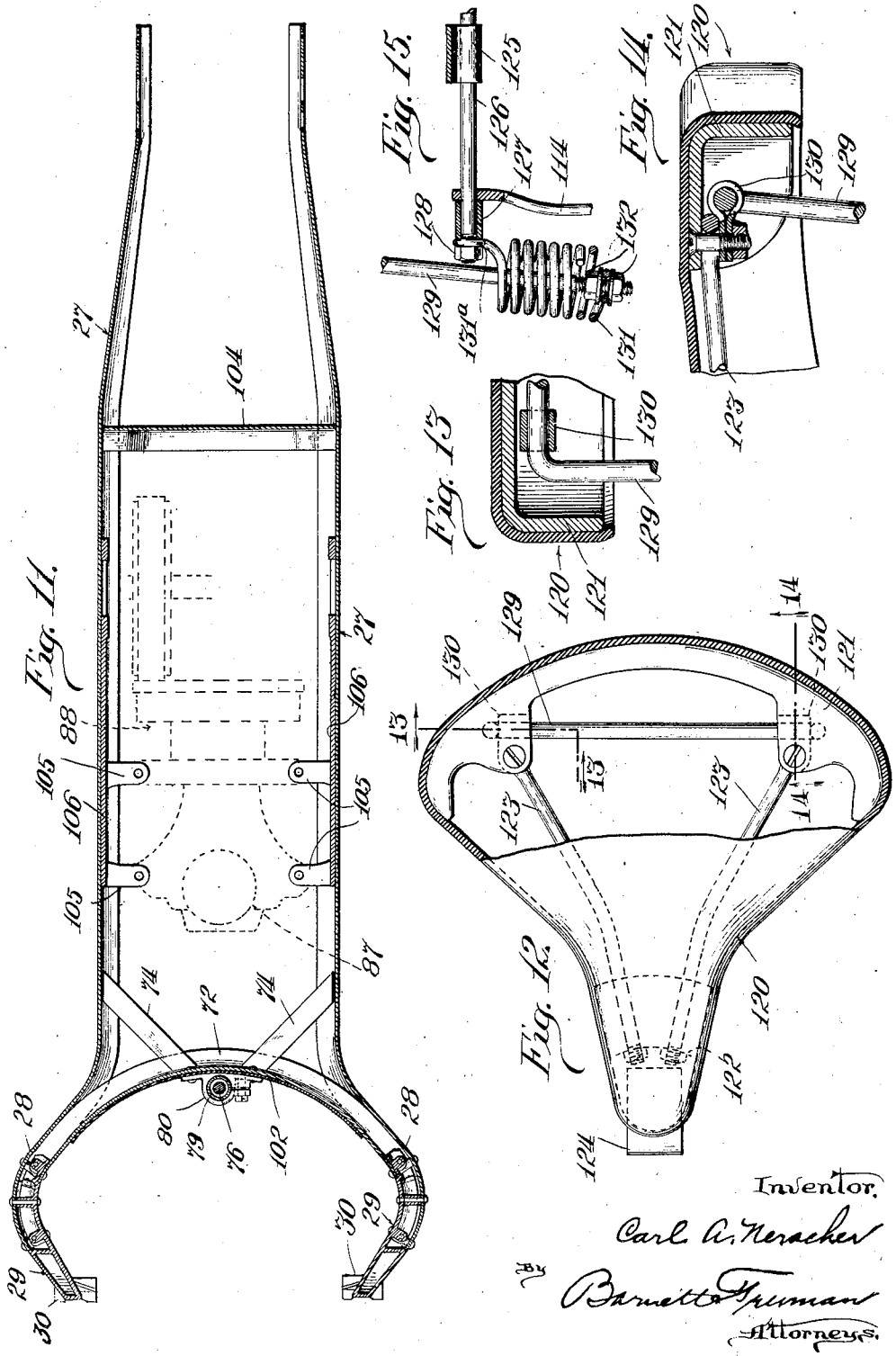

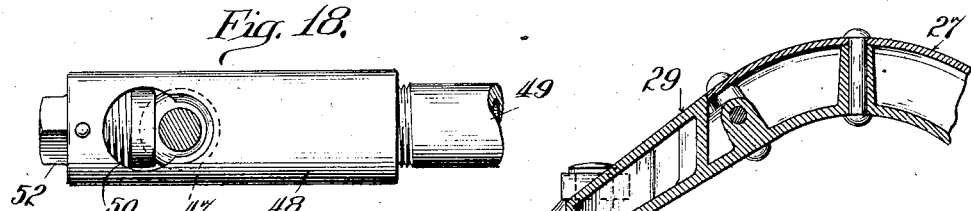
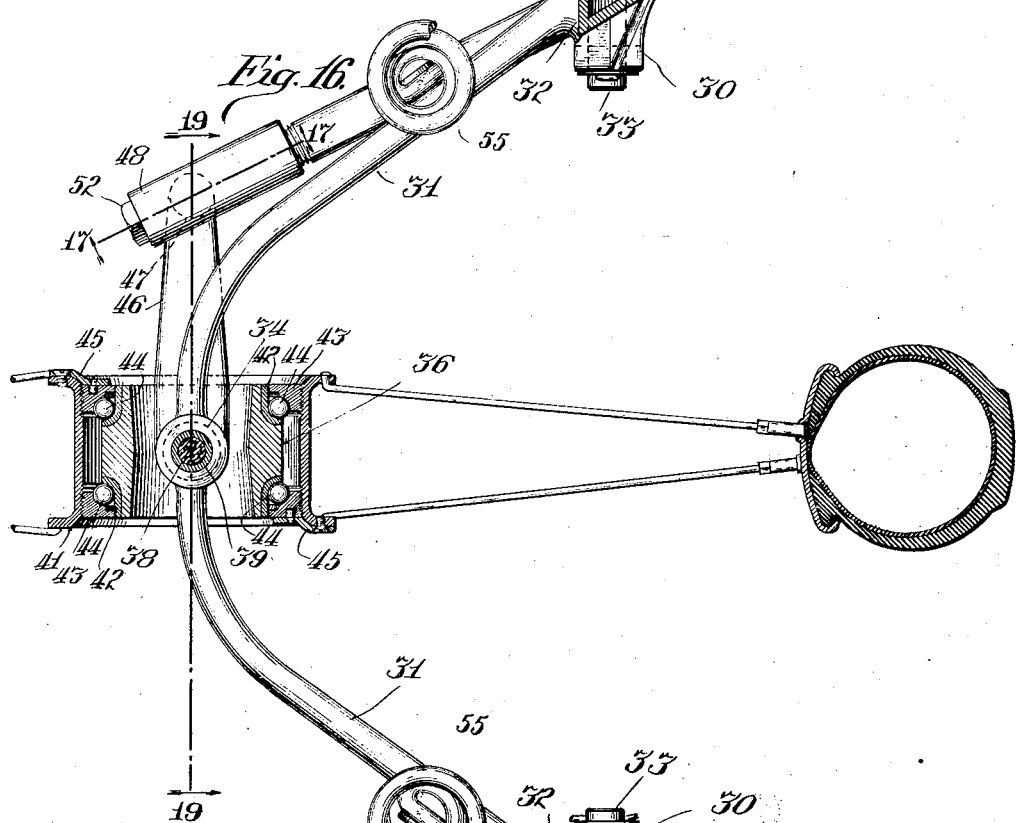
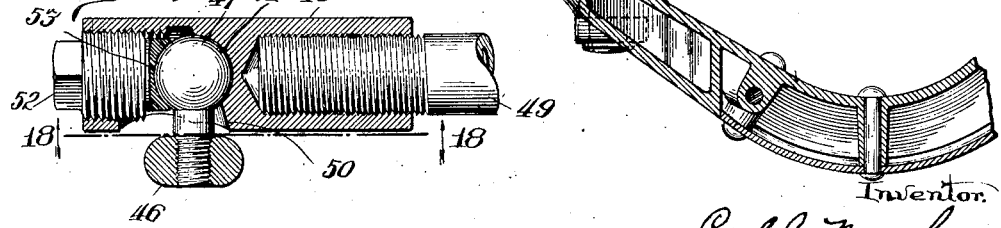

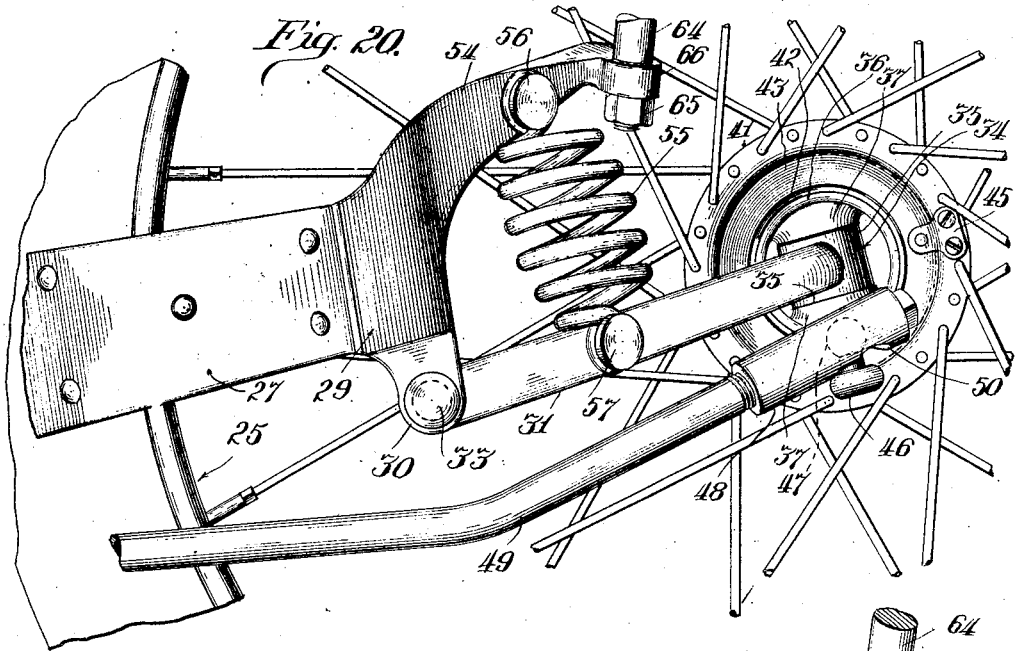
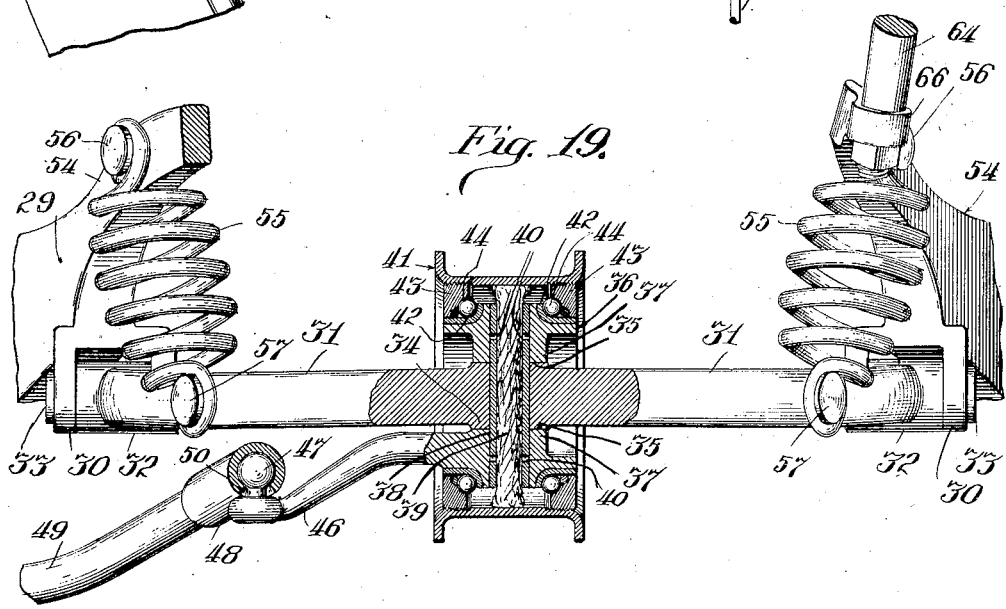
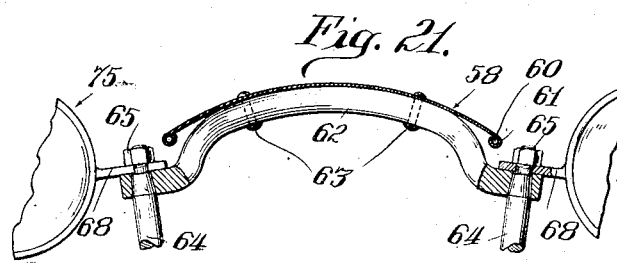

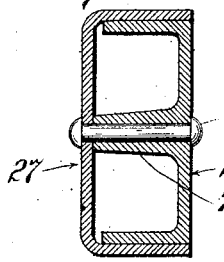
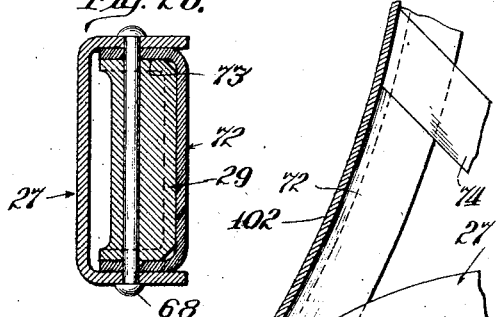
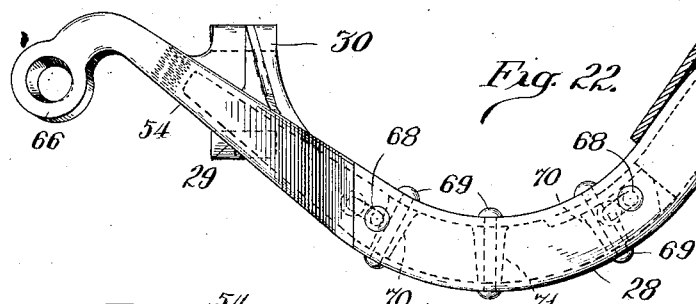
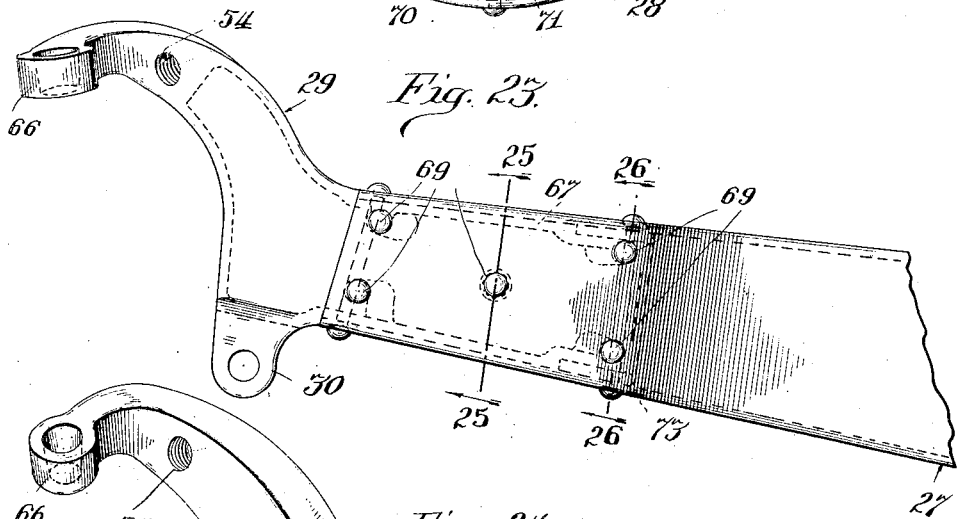
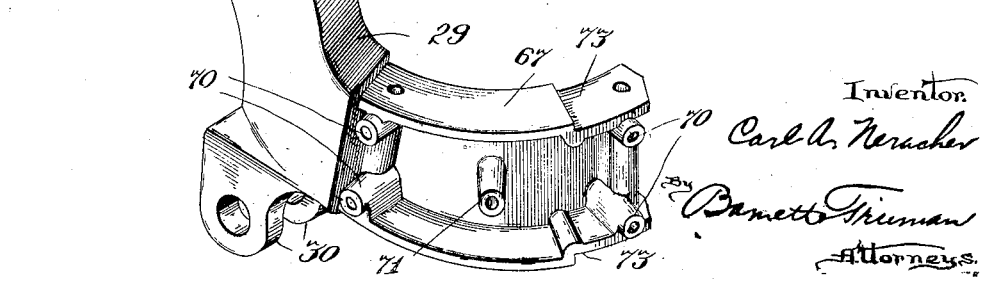

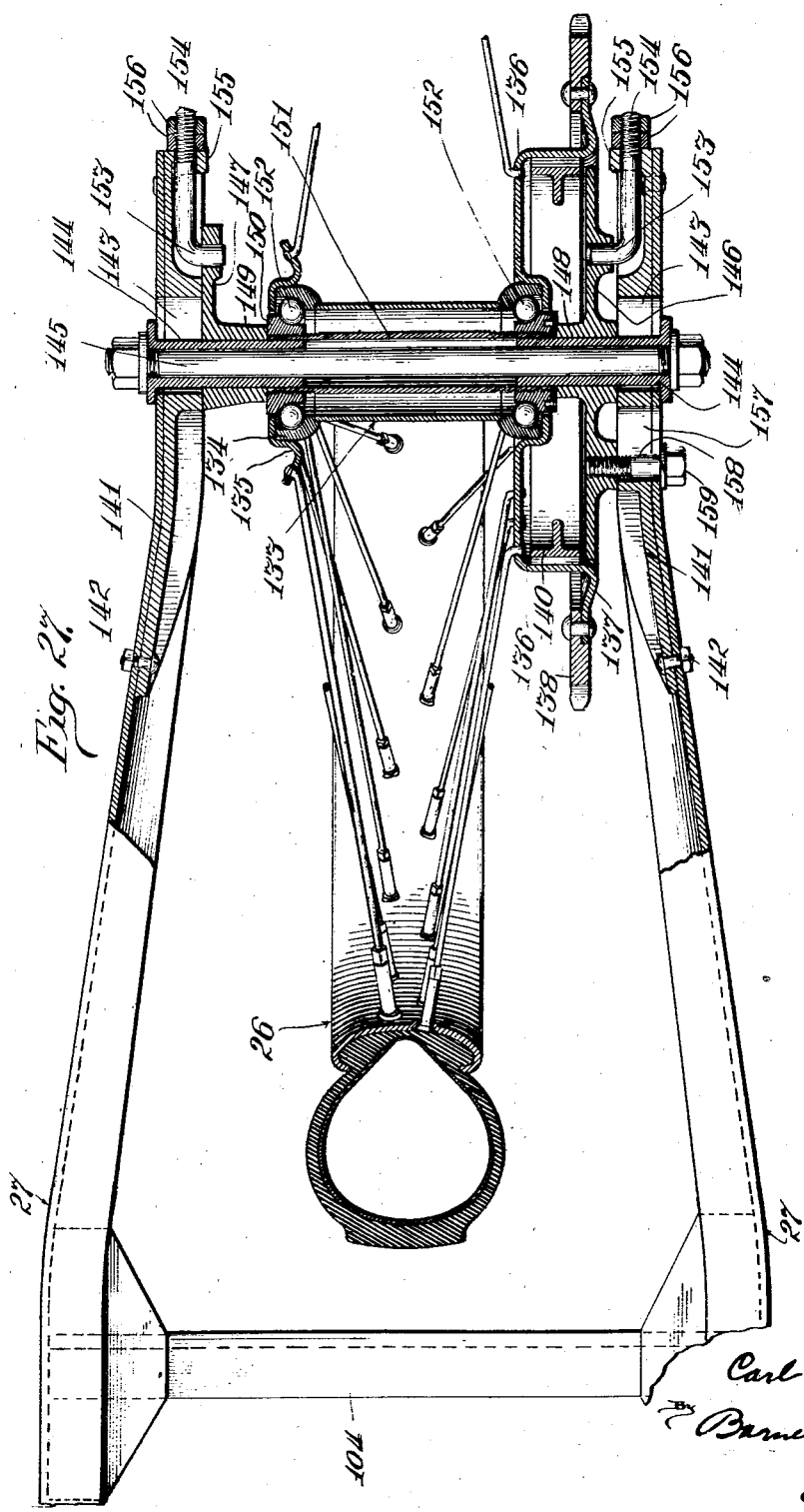

Patented July 21, 1925.

1,547,157

UNITED STATES PATENT OFFICE.

CARL A. NERACHER, OF SYRACUSE, NEW YORK, ASSIGNOR TO NER-A-CAR CORPORATION, A CORPORATION OF NEW YORK.

MOTOR CYCLE.

Application filed June 27, 1921. Serial No. 480,770.

*To all whom it may concern:*

Be it known that I, CARL A. NERACHER, a citizen of the United States, residing at Syracuse, in the county of Onondaga and State of New York, have invented certain new and useful Improvements in Motor Cycles, of which the following is a specification.

My invention relates to motorcycles, more particularly to motor bicycles (although certain features will be found applicable to three-wheeled vehicles, for example), this invention being concerned primarily with the frame, wheel mountings, steering gear, mud and dust guards, and other parts making up the chassis of the motorcycle. In another application filed August 14, 1921, Serial No. 491,781, I have described and claimed the power plant, transmission mechanism and controlling devices as I prefer to construct and arrange them for a motorcycle of the type shown herein. Incidentally, certain parts of the power plant and appurtenances are illustrated on the drawings hereof, but no claim is made to the same in this application.

The principal objects of the invention are: To provide a motorcycle which may be manufactured and sold at a relatively low price; to construct the frame structure of the motorcycle and the other parts of the chassis so that the cycle, without sacrificing requisite strength and rigidity, will be light in weight thereby making the management of the motorcycle easy, and minimizing cost of fuel; to provide a motorcycle which will be of a simple and compact construction consisting of a relatively small number of parts easily manufactured and assembled and readily replaced if damaged; to so construct the machine that the driver is protected from dust, mud, grease, and the like, the invention contemplating a substantially complete housing of the driving and transmission mechanisms and an arrangement of mud guards effectively preventing the clothing of the rider from being soiled by mud or dust thrown by the wheels; to provide a motorcycle which can be ridden by a woman in woman's clothing as well as a man, and which, because of the peculiar construction of the frame, makes mounting and dismounting easier and safer than is the case with the ordinary motor bicycle; and to provide a motorcycle chassis arranged to support the motor and transmission mechanism, which are necessarily rather heavy, at a low level thereby increasing the stability of the machine and facilitating its management. In general, the invention aims at the production of a motor driven vehicle of the general type of motorcycle which, besides being cheaper to manufacture than the ordinary motorcycle, will be more useful to the average person for ordinary purposes of transportation because of its safety, ease of management and cleanly operation than the motorcycles now in common use.

The above stated objects and such other incidental objects of the invention as will be mentioned hereafter are attained through the constructions, arrangements and combinations of parts shown in the accompanying drawings and to be hereinafter described and claimed.

In the drawings,

Fig. 1 is a side elevation, fragmentary with respect to the front end of the machine, of a motor bicycle constructed in accordance with the principles of my invention.

Fig. 2 is a longitudinal sectional view of the machine, omitting the wheels and driving and transmission mechanisms, taken through a central vertical plane, certain parts being shown in elevation.

Fig. 3 is a view, in perspective, of one of the two side frame members of the chassis.

Fig. 4 is a plan view of the motorcycle.

Fig. 5 is a view, in perspective, of the fixed dash-board mud-guard for the front wheel.

Fig. 6 is a view, in perspective, of the pan or lower member of the housing which encloses the driving mechanism.

Fig. 7 is a sectional view on line 7—7 of Fig. 2, looking in the direction of the arrows.

Fig. 8 is a similar view, on line 8—8, of Fig. 2.

Fig. 9 is a view, in perspective, of the rear housing member of the frame and associated parts.

Fig. 10 is a sectional view on line 10—10 of Fig. 8.

Fig. 11 is a sectional plan illustrating the frame structure of the chassis, other parts of the machine being omitted.

Fig. 12 is a fragmentary plan view of the saddle.

Figs. 13 and 14 are sectional views on lines 13—13 and 14—14, respectively, of Fig. 12.

Fig. 15 is a detail view showing the hinged connection of the saddle with the rear mud-guard.

Fig. 16 is a fragmentary sectional plan view illustrating the construction of the front wheel assembly.

Fig. 17 is a sectional view on line 17—17 of Fig. 16.

Fig. 18 is a sectional view on line 18—18 of Fig. 17.

Fig. 19 is a sectional view on line 19—19 of Fig. 16.

Fig. 20 is a fragmentary view, in elevation, illustrating the mounting of the front wheel on the frame;

Fig. 21 is a fragmentary sectional view on line 21—21 of Fig. 4.

Fig. 22 is a fragmentary plan view of one side of the forward portion of the frame.

Fig. 23 is a side elevation of the parts shown in Fig. 22.

Fig. 24 is a view, in perspective, of one of the castings on which the front wheel suspension member is mounted;

Figs. 25 and 26 are sectional views on lines 25—25 and 26—26 of Fig. 23; and

Fig. 27 is a fragmentary sectional plan illustrating the construction and arrangement of parts in the rear wheel assembly.

Referring to the drawings, the numerals 25, 26 designate the front and rear wheels of the motorcycle, which wheels may be of any desired construction. The wheels support a frame structure which is substantially horizontal and arranged approximately in line with the wheel centers. This frame structure is preferably composed, to a large extent, of sheet metal stampings formed and secured together so that the structure is very light in comparison with its strength and rigidity. The structure comprises two side frame members 27 (Fig. 3) which are preferably channel-shaped in cross-section, the frame members being arranged with their flanges projecting inwardly toward each other. The forward ends of the side frames 27 are bowed out, as indicated at 28, to provide space for the steering movements of the front wheel 25 and each side frame has secured to its forward end, fitted into the channel thereof, a casting 29 (Fig. 24). These castings 29 are formed with forked portions 30 for pivotal connection to the side frames of the front wheel carrier or suspension member 31, the latter consisting preferably of in integral bowed yoke member formed at its extremities with bosses 32 which engage the forked portions 30 of the castings 29, the connection being completed by pintles 33. The yoke 31 is formed at its middle portion with a boss 34, the upper and lower flat surfaces 35 of which are inclined downwardly, to a slight extent, from front to rear. The wheel 25 revolves on a hollow axle member 36 formed with interior projections 37, 37 having flat inclined faces adapted to bear upon the upper and lower faces 35 of the boss 34. A pivot pin 38 extends through the axle member 36 and through the boss 34 of yoke 31 having a drive fit or other rigid connection with the yoke and a sufficiently loose fit with the axle to allow the latter to turn thereon. Preferably the pivot pin 38 is hollow and is provided with a wick 39 soaked in a lubricant. Perforations 40 are formed in the pivot pin to allow lubrication of the surfaces of the axle and pin in contact with each other.

The hub 41 of wheel 25 is mounted to revolve on axle 36 in any suitable manner. I have shown the axle member as being provided with inner raceway members 42, 42, outer raceway members 43, 43, the latter being screwed into the hub. Anti-friction balls 44 are arranged between said members. Members 43 are kept in place by clips 45. The axle member 37 is formed with a rigid steering arm 46 provided with a ball 47 (Fig. 17) adapted to fit into the ball casing 48 screwed upon the threaded end of a drag link 49. The under side of casing 48 is formed with an opening 50 (Fig. 18) large enough to admit the ball 47 which is thereafter held in place against the socket cavity 51 of the casing by means of a screw plug 52 having a curved face 53. The drag link 49 is connected with the lower end of a substantially upright steering post the construction and mounting of which on the vehicle will be hereinafter described.

The castings 29 at the forward ends of the side frames 27 are formed with arms 54 projecting forwardly of the pivotal points of yoke 31 with the castings. Coiled springs 55 are interposed between the arms 54 and the yoke 31, being preferably connected to studs 56 on the castings and studs 57 on the yoke at points intermediate the pivotal points of the yoke and the middle or forward portion to which the wheel axle is pivoted. The springs 55 act as compression and tension springs to cushion the shock of the frame when the front wheel encounters an obstacle and to absorb the stress developed by the rebound. The pivot pin 38 on which the front wheel axle turns for steering is raked backwardly a trifle as above stated, primarily so that the wheel when turned from its normal alignment with the rear or driving wheel will tend to return automatically to such normal alignment thereby making the steering of the vehicle feasible. This raking of the steering wheel axle pivot also serves, in conjunction with the pivoted resilient connection between the front wheel carrier and the frame, to ease the motorcycle over inequalities of the road.

In place of the usual front wheel mud-guard that turns with the wheel and is necessarily rather narrow, the motorcycle of my invention is provided with a fixed mud-guard 58 (Fig. 5) which spans the frame at its widest point and is, in effect, a species of dash-board. The dash-board mud-guard is a pressed steel member preferably having its lower edges reinforced on the inside with strips 59, 59, and its outer edge with a wire 60 enclosed by a beading 61 (Fig. 21). It is wide at the back and bottom and tapers upwardly and forwardly. The lower edges are secured to the side frame members 27 at the bowed out portions 28 of the same. This arrangement gives adequate protection to the driver against mud and dust thrown by the front wheel. Moreover, the front mud-guard forms a unitary part of the vehicle frame structure, thereby adding to the strength and rigidity of said structure.

With this object in view, a transverse member 62 is arranged under and across the front mud-guard to which the latter may be riveted as shown at 63. Stay rods 64 are secured to the ends of the transverse member 62 by nuts 65 and extend downwardly and are anchored to lugs 66 on the arms 54 of the castings 29. The portions 67 of the castings 29, which fit into the forward curved ends 28 of channeled side frames 27, are of box-like configuration (Figs. 24 and 25), the casting being secured to the side frame member, in each case, by rivets 68, 68 passing through the parts from top to bottom, and horizontal rivets 69 which extend through bosses 70, 71 formed on the portion 67 of the casting 29.

The side frame members 27 are connected with each other by means of a channel-shaped backwardly curved transverse member 72, arranged with its open side toward the back of the machine and with its forward ends aligned and engaged with the outwardly curved portions 28 of the side frame members. The forward ends of the transverse member 72 overlap the rear ends of castings 29 which are reduced in width and height for this purpose, as shown at 73. The rivets 68, 69 at the rear end of the casting serve also to secure the transverse member 72 to the side frames. The construction is further strengthened by diagonal struts 74 extending from the middle portion of member 72 to the side frame members.

The box girder constructions provided by the arrangements just described give great strength and rigidity to the forward part of the frame which may be subjected to heavy shocks and weaving strains when the machine is run over rough roads.

The motorcycle is preferably provided with two head lights 75, 75, arranged on opposite sides of the front mud-guard, the brackets 68 of which are clamped to opposite ends of members 62 by the nuts 65 (Fig. 21).

The front wheel assembly of the motorcycle of this invention differs radically, it will be seen, from the type of front wheel assembly ordinarily employed in motorcycles in that there is no front fork. The front wheel carrier 29 and its associated springs affords the sole means for supporting the frame on the front wheel. The steering of the wheel is accomplished by a steering post and drag link mechanism. These arrangements make possible a fixed dashboard type of front mud-guard having the advantages above noted.

The steering post 76 is provided with a laterally projecting arm 77 with which the drag link 49 is articulated by any suitable flexible joint 78, such as that shown in Figs. 17 and 18 and previously described. The steering post turns in a tubular casing 79 which is stepped in a clamping casting secured to the front side of the cross frame member 72 (Figs. 11 and 22). The upper portion of casing 79 passes through a boss 81 formed on the front mud-guard 58, the upper extremity of the casing being braced to the mud-guard by a strut 81 riveted to the mud-guard at 82 and clamped at 83 around the casing. A soft rubber bushing 84 is interposed between the casing and the mud guard, the opening in which is larger than the casing to prevent injury to the mud-guard through vibration of the casing. The steering post 76 is provided with a handle bar 85 having hand grips 86. The drag link 49 having threaded connections with joints 48 and 78, it is a simple matter to make an adjustment of the steering gear to bring the handle bar in proper angular relationship with the front wheel.

The driving mechanism of the motorcycle, including the gasoline motor indicated at 87, and the transmission mechanism, certain parts of which are shown in dotted lines in Figs. 1 and 11 and are designated 88, are supported on the side frame members 27 and are substantially completely housed except for the upper end of the motor cylinder. The middle portion of the frame structure of the chassis, the portion between the front wheels, constitutes, in effect, a housing for this purpose. This housing is made up, in addition to the side frame members 27, of the following parts: 89 is a bottom member or pan (Figs. 1, 2, 6 and 9) the upper side edges of which are flanged at 90 for bolting to the lower flanges of the side frames and the forward portion of which slopes up toward the frame as shown at 91 and terminates in a lip 92 projecting upwardly between the side frames. 93 is a removable top member formed with an opening 94 through which the motor cylinder projects, and with an opening 95 for a portion of the carburetor 96, the top member being provided with clips 97 (Fig. 7) engaging the upper flanges of the side frame members 27. 98 is a rear housing member (Figs. 8 and 9) the lower edges 99 of which overlap and are secured to the outer faces of the side frame members. The removable top member 93 may be held in place in any suitable manner. As shown in the drawings, the carburetor 96 has a threaded cap 100 which is screwed down upon an upstanding flange 101 (Fig. 2) formed around opening 95. Preferably the front end of the housing, as just described, is closed, or substantially so, by means of a sheet of metal 102 (Figs. 2, 11 and 22) arranged under and secured to the front mud-guard and to the forward cross frame member 72. The purpose of thus enclosing the driving mechanism of the motorcycle in a housing substantially closed at the front is to prevent a circulation of air past the motor which might over cool it. There is an opening between the side frame members forward of the pan but any air entering the housing at this place is heated by contact with the muffler 103 (Fig. 2).

The rear end of the frame structure is rigidified by a cross frame member 104 (Fig. 11). The motor itself spans the space between the side frames, thereby rigidifying the frame structure, the motor being carried upon inwardly projecting lugs 105 on a pair of supporting members 106 arranged in the channels of the side frames and secured thereto.

The foot boards of the machine are secured to the side frame members just back of the bowed out portions 28 of the frames. The foot boards are preferably made each in two sections, a fixed inner section and a hinged outer section, the latter being hinged so that it will fold or bend upwardly in case the machine should fall on its side, breakage of the foot board being thus prevented. In Fig. 7 the fixed section of the foot board (the construction being the same on both sides of the machine) is shown at 107 and the hinged section at 108. 109 designates the hinge which allows the inner edge of the hinged section to abut against the adjacent edge of the fixed section when the hinged section is in its extended position. In case the machine falls on its side the hinge will flex allowing the upper section to fold toward the motorcycle. The fixed section of the board is protected by the widening of the front end of the frame. The foot boards, arranged as they are in the recess provided by the widening of the frame, serve to increase the strength and rigidity of the frame structure.

The housing member 98 (Figs. 1, 2, 8, 9 and 10) is formed with a recess or cradle 110 to support the fuel tank 111. The latter has a filling neck 112 closed by a screw cap 113. The back edges of the housing member 98 are reinforced by diagonal braces 114 which are also secured to the rear mud-guard 115, the latter fitting into the back of the housing member 98 and being secured to the upstanding ears 116 thereof, and at the lower end to the rear cross frame member 104 (Fig. 2). The rear portion of the mud guard is preferably supported by braces 117 extending down to the ends of the side frame members. The rear mud guard may have the conventional curved configuration. Preferably, however, the top of the same is provided with a flattened or widened portion 118 (Fig. 4), formed with ribs 119 to give strength. This flattened portion, when the mud-guard is so formed, may serve as a convenient place either for a second seat or for a parcel carrier.

The saddle 120 is arranged above the fuel tank 111. The seat or leather portion of the saddle is supported at the back by a frame member 121 (Figs. 2, 12, 13, 14 and 15) and at the front by a casting 122, the latter connected with the frame 121 by stay rods 123. 124 is a leaf spring connected at its forward end to the casting 122 and having a loop 125 at its rear end extending around a rod 126 which passes through the upper ends of the rear mud-guard braces 114 and is held in place by spacers 127 and nuts 128. The leaf spring bears at a point intermediate its ends upon the cap 113 of the fuel tank 111, the top of which cap is preferably rounded. The rear end of the saddle is supported by a rectangular yoke 129 passing through loops 130 fastened to the under side of the saddle frame 121. The ends of the yoke 129 pass through coiled springs 131, the upper ends of which springs are formed with loops 131ª extending around the cross rod 126, the lower ends of the springs being secured by nuts 132 to the extremities of the yoke 129.

With a saddle constructed as above described and arranged with its leaf spring 124 bearing on the gasoline tank, several advantages are obtained. The space under the saddle is utilized and a convenient place found for a fuel tank of large capacity. A bearing is provided for the leaf spring of the saddle substantially midway between the ends of the saddle so that the saddle has a substantially vertical movement. This adds to the comfort of the driver and makes the operation of the machine more safe since on a rough road the oscillatory movements of the saddle and driver are substantially up and down movements instead of being tilting movements which might tend to throw the driver backwardly or forwardly. The saddle can be turned back on cross rod 126 as an axis giving access to the fuel tank for filling purposes.

The rear wheel assembly is illustrated in Fig. 27. The rear ends of the side frame members 27 are bent inwardly to narrow the frame at the place where the rear wheel 26 is mounted. The rear wheel has a hub composed of a sleeve 133, ball raceways 134 and discs 135, 136, the latter forming a brake drum and having secured to a flange 137 thereof a sprocket wheel 138 for the driving chain 139. 140 indicates the braking element within the brake drum. 141, 141 are rigidifying and supporting members secured to the side frames within the channels thereof by rivets 142. The side frame members and members 141 are provided with registering slots 143 through which extend flanged bushings 144 adapted to receive a clamping bolt 145 which extends across the machine from side to side. Arranged on the bushings 144 are adjusting members 146, 147 formed with bosses 148, 149 to bear against ball races 150 fixed to a sleeve 151. The numerals 152 designate the anti-friction balls operating between races 134 and 150. The adjusting members 146, 147 are perforated to receive the bent ends 153 of adjusting screws 154 which extend through lugs 155 on members 141 and are provided with set and lock nuts 156. The side frame and adjacent supporting member 141 on the side of the machine at which adjusting member 146 is placed, are formed with a pair of registering slots 157 to receive a bolt 158 fixed to member 146 and threaded at its outer end for a locking nut 159. The adjusting screws 154 take the thrust of the drive chain. The bolt 158 and its nut hold the rear wheel from displacement rearwardly. 160 (Fig. 1) designates a chain guard which extends from the rear edge of the housing member 98 to the rear mud-guard brace 117 over the drive chain 139.

It will be understood that all of the several features of my invention as above described need not be used conjointly in the same motorcycle. However, there is a distinct advantage in the conjoint use of the more salient of these features which, it will be seen, have a close interrelationship when the primary purposes of the invention are considered. The low, horizontally disposed frame instead of the usual diamond frame, necessary in order that mounting and dismounting may be made easy and the machine given stability through location of the driving mechanism at a low level, lends itself to the housing of the driving mechanism, the hollow structure affording the required strength and rigidity as well as enclosing the mechanism for purposes of safety and cleanliness. The dash-board front fender rigidifies the housing-frame, being a unitary part thereof. The side frame members, housing and front mud guard are constructed and united so as to reinforce each other forming together a frame which is unitary in this sense. This type of front mud-guard is feasible because the front wheel is not steered by the usual front fork but is controlled by means of a steering post and drag link steering mechanism. This type of steering mechanism allows a very advantageous mounting of the front wheel on a forwardly projecting wheel carrier resiliently connected with the frame of the machine, the arrangement being advantageous because peculiarly calculated to ease the vehicle over obstructions in the road. The elimination of the front fork structure, characteristic of motorcycles as a class, is of distinct advantage because of the liability of such fork constructions to become broken through road shocks. By employing the low horizontal type of frame instead of the diamond frame a new arrangement of the fuel tank had to be found. The problem was solved by placing the tank under the saddle and utilizing the tank as a support for a saddle of the type described in which the movements of the driver in passing over obstructions or inequalities of the road are up and down movements. The spreading of the front part of the frame, necessary to allow the front wheel to be turned in steering, gives strength to the frame structure of the machine and allows a wide spread to the front mud-guard which is an advantage from the point of view of protecting the rider and also in the matter of strengthening the frame structure of the motorcycle. The combination of parts thus summarized, is, therefore, desirable and makes possible a motorcycle which, in general design, is a radical departure from the types of motorcycle in general use and which has utilities and advantages of novel character. At the same time it is realized that certain of the new features herein shown and described might be used to advantage in a motorcycle or like vehicle of a sort different from the type more especially contemplated by my invention and shown and described herein. It is consequently my intention to cover the several novel features of invention both in combination and separately, as set forth in the appended claims.

The present application is a continuation in part of my co-pending applications Serial No. 290,979, filed April 18, 1919, Serial No. 332,243, filed October 31, 1919, and Serial No. 332,244, filed October 31, 1919, the present application, however, disclosing certain features of improvement not disclosed in any of the above stated applications.

I claim:

1. A motorcycle comprising, in combination, aligned front and rear wheels and a substantially horizontal frame supported thereon at approximately the level of the wheel centers, the middle portion of which is hollow to constitute a housing for the driving mechanism of the motorcycle which extends continuously from the front wheel to the rear wheel and is closed at the top, said housing comprising a section which is removable to give access to said mechanism.

2. A motorcycle comprising, in combination, aligned front and rear wheels and a substantially horizontal frame supported thereon at substantially the level of the wheel centers, comprising, as a unitary structure, a rear portion formed to embrace the rear wheel, a middle, hollow portion to provide a housing for the driving mechanism of the motorcycle, and a front wheel dash-board mud-guard which extends upwardly and forwardly from the hollow middle portion over the front wheel.

3. A motorcycle comprising, in combination, aligned front and rear wheels and a substantially horizontal frame supported thereon at substantially the level of the wheel centers, comprising, as a unitary structure, front and rear portions formed to embrace the front and rear wheels respectively, a middle hollow portion to provide a housing for the driving mechanism of the motorcycle, a front wheel dash-board mud-guard extending forwardly over the front wheel, and a housing member partially enclosing the rear wheel.

4. A motorcycle comprising, in combination, aligned front and rear wheels and a substantially horizontal frame supported thereon at substantially the level of the wheel centers, comprising, as a unitary structure, front and rear portions formed to embrace the front and rear wheels respectively, a middle hollow portion to provide a housing for the driving mechanism of the motorcycle, a front wheel dash-board mud-guard, a housing member partially enclosing the rear wheel, and a closure sheet within the front mud-guard to check the flow of air into the housing.

5. A motorcycle comprising, in combination, aligned front and rear wheels and a combined housing and frame supported thereon, comprising, as a unitary structure, a middle hollow portion to provide a housing for the driving mechanism of the motorcycle which is substantially at the level of the wheel centers and front and rear portions extending upwardly from the middle portion over the front and rear wheels respectively, the front portion of said frame being wider than the rest of the structure to allow turning of the front wheel.

6. A motorcycle comprising, in combination, aligned front and rear wheels and a substantially horizontal frame supported thereon at substantially the level of the wheel centers, comprising, as a unitary structure, front and rear portions formed to embrace the front and rear wheels respectively, the front portion of the frame being wider than the rest of the structure to allow turning of the front wheel, a middle hollow portion to provide a housing for the driving mechanism of the motorcycle, and a front wheel dash-board mud-guard united to the structure at said wide portion and extending upwardly and forwardly over the front wheel.

7. A motorcycle comprising, in combination, aligned front and rear wheels and a substantially horizontal frame supported thereon at substantially the level of the wheel centers, comprising, as a unitary structure, front and rear portions formed to embrace the front and rear wheels respectively, the front portion of the frame being wider than the rest of the structure to allow turning of the front wheel, a middle hollow portion to provide a housing for the driving mechanism of the motorcycle, a front wheel dash-board mud-guard united to the structure at said wide portion and extending upwardly and forwardly over the front wheel, and a rear wheel housing.

8. A motorcycle comprising, in combination, aligned front and rear wheels and a substantially horizontal frame supported thereon at substantially the level of the wheel centers, comprising, as a unitary structure, front and rear portions formed to embrace the front and rear wheels respectively, a middle, hollow portion to provide a housing for the driving mechanism of the motorcycle, comprising a member removable to give access to said driving mechanism.

9. A motorcycle chassis comprising front and rear wheels, spaced side frame members on opposite sides of said wheels, and a front wheel dash-board mud-guard rigidly connected to said frame members and extending forwardly over the front wheel.

10. A motorcycle chassis comprising front and rear wheels, spaced side frame members on opposite sides of said wheels outwardly bowed at the front to permit turning of the front wheel, and a front wheel dash-board mud-guard rigidly connected to said frame members at said bowed places.

11. A motorcycle chassis comprising front and rear wheels, spaced side frame members on opposite sides of said wheels, a front wheel dash-board mud-guard rigidly connected to said frame members, and a rear wheel housing member rigidly connected with said frame members.

12. A motorcycle chassis comprising front and rear wheels, spaced side frame members on opposite sides of said wheels, a front wheel dash-board mud-guard extending forwardly over the front wheel and rigidly connected to said frame members, a hollow, upwardly extending member secured to the frame members in front of the rear wheel, and a pan secured to the center portion of the frame members at the bottom thereof.

13. A motorcycle chassis comprising front and rear wheels, spaced side frame members on opposite sides of said wheels, a front wheel dash-board mud-guard rigidly connected to said frame members, a hollow, upwardly extending member secured to the frame members in front of the rear wheel, a pan secured to the center portion of the frame members at the bottom thereof, and a top section between the front wheel mud-guard and said hollow member which is removable to give access to the driving mechanism.

14. A motorcycle chassis comprising front and rear wheels, spaced side frame members bowed at the front, cross frame members connecting said side frame members, a front mud-guard secured to the bowed portions of the side frame members, a rear wheel housing secured to the side frame members forwardly of and adjacent the rear wheel, a pan extending across the structure from side frame to side frame, and a removable top section.

15. A motorcycle chassis comprising front and rear wheels, spaced side frame members bowed at the front, cross frame members connecting said side frame members, a front mud-guard secured to the bowed portions of the side frame members, a rear wheel housing secured to the side frame members adjacent the rear wheel, a pan extending across the structure from side frame to side frame, a removable top section, a fuel tank supported on the aforesaid structure adjacent the rear wheel, and a seat arranged over said fuel tank.

16. A motorcycle chassis comprising front and rear wheels, spaced side frame members on opposite sides of said wheels, a front wheel dash-board mud-guard rigidly connected to said frame members, a front wheel carrier pivoted to and resiliently connected with the forward ends of said side frame members, a front wheel axle pivoted to the carrier for steering movements of the wheel, a steering post extending through and revolubly mounted in said frame and front mud-guard, and a link connecting the lower end of said post and said axle.

17. A motorcycle chassis comprising front and rear wheels, spaced side frame members on opposite sides of said wheels, a front wheel dash-board mud-guard rigidly connected to said frame members, a front wheel carrier pivoted to and resiliently connected with the forward ends of said side frame members, a front wheel axle pivoted to the carrier for steering movements of the wheel, a cross frame member between said side frame members, a tubular steering post casing rigidly connected with said cross frame members and the front mud-guard, a steering post in said casing, and a link connecting said steering post with the front wheel axle.

18. A motorcycle chassis comprising front and rear wheels, a frame at substantially the level of the wheel centers for supporting the driving mechanism of the motorcycle, the frame being widened at the front to allow steering movements of the wheel, and a front wheel mud-guard united to the widened portion of the frame and extending from side to side thereof and over the front wheel.

19. A motorcycle chassis comprising front and rear wheels, a frame at substantially the level of the wheel centers for supporting the driving mechanism of the motorcycle, the frame being widened at the front to allow steering movements of the wheel, a front wheel mud-guard united to the widened portion of the frame and extending from side to side thereof and over the front wheel, a front wheel axle pivotally mounted for steering movements of the wheel, and a steering mechanism comprising a steering post and a link connecting said post with the axle.

20. In a motorcycle chassis, the combination of front and rear wheels, and a substantially horizontal frame structure comprising front and rear portions formed to embrace the wheels, respectively, the front portion being widened to allow steering movements of the front wheel, a middle portion hollow to house the driving mechanism of the motorcycle, a front mud-guard secured to the widened portion of the frame structure, which has the width of the frame at the bottom and tapers forwardly and upwardly over the wheel, and a rear housing member adjacent the rear wheel.

21. In a motorcycle chassis, the combination of front and rear wheels, a substantially horizontal frame structure comprising front and rear portions formed to embrace the wheels, respectively, the front portion being widened to allow steering movements of the front wheel, a middle portion hollow to house the driving mechanism of the motorcycle, a front mud-guard secured to the widened portion of the frame structure, which has the width of the frame at the bottom and tapers forwardly and upwardly over the wheel, a rear housing member adjacent the rear wheel, a fuel tank supported on said rear housing portion, and a seat arranged over said fuel tank.

22. In a motorcycle chassis, the combination of front and rear wheels, a substantially horizontal frame structure comprising front and rear portions formed to embrace the wheels, respectively, the front portion being widened to allow steering movements of the front wheel, a middle portion hollow to house the driving mechanism of the motorcycle, a front wheel mud-guard secured to the widened portion of the frame structure, which has the width of the frame at the bottom and tapers forwardly and upwardly over the wheel, a rear housing member adjacent the rear wheel, a fuel tank supported on said rear housing portion, a seat arranged over said fuel tank, a front wheel axle pivotally mounted for steering movements of the wheel, a steering post and a link connecting said axle and post.

23. In a motorcycle chassis, the combination of front and rear wheels, a frame structure supported on said wheels comprising pressed steel channel-shaped side frame members on opposite sides of said wheels, the forward portions of which are bowed outwardly to allow turning movements of the wheel, and a pressed steel dash-board mud-guard secured to the side frame members at the bowed portions which at the bottom has substantially the width of the frame and tapers upwardly and forwardly over the front wheel.

24. In a motorcycle chassis, the combination of front and rear wheels, a frame structure supported on said wheels comprising pressed steel channel-shaped side frame members on opposite sides of said wheels, a pressed steel front mud-guard secured to said channel-shaped members, and a pressed steel rear housing member.

25. In a motorcycle chassis, the combination of front and rear wheels, a frame structure supported on said wheels comprising pressed steel channel-shaped side frame members on opposite sides of said wheels, a pressed steel front mud-guard secured to said channel-shaped members, a pressed steel rear housing member, and pressed steel upper and lower members at the middle of the frame structure one of which is removable.

26. A motorcycle frame consisting of a central hollow portion at substantially the level of the wheel centers, an upwardly and forwardly projecting front mud-guard portion, and a rearwardly and upwardly projecting rear mud-guard portion both rigid with said hollow portion.

27. A motor bicycle frame consisting of a pressed sheet steel structure which is hollow at the middle and is supported on the wheels at substantially the level of the wheel centers, and is provided with an upwardly and forwardly extending front wheel mud-guard rigidly fixed thereto.

28. A motorcycle chassis comprising aligned front and rear wheels, a frame at approximately the level of the wheel centers, which is supported on said rear wheel, and a front wheel carrier pivoted to and projecting forwardly and upwardly from the front end of said frame which provides the sole means of supporting said frame on said front wheel.

29. In combination with the rear wheel of a motorcycle, a frame structure substantially horizontal, at the level of the rear wheel center and hollow to house the driving mechanism of the motorcycle, comprising side frame members supported on said rear wheel, a housing arranged forwardly of said wheel and connected with said side frame members and partly housing the rear wheel, and a rear mud guard fitted into and secured to said housing member.

30. In combination with the rear wheel of a motorcycle, a frame structure substantially horizontal, at the level of the rear wheel center and hollow to house the driving mechanism of the motorcycle, comprising side frame members supported on said rear wheel, a housing member arranged forwardly of said wheel, united with said side frame members and formed to provide a fuel tank cradle, a fuel tank supported in said cradle, and a saddle having a spring adapted to bear on said tank.

31. In a motorcycle, the combination of a front steering wheel, a frame substantially horizontal at approximately the level of the wheel center, and a dash-board mud-guard for said wheel which is rigidly connected with the frame and extends back of and partly over said wheel.

32. In a motorcycle, the combination of a front steering wheel, a frame substantially horizontal at approximately the level of the wheel center, a dash-board mud-guard for said wheel which is rigidly connected with the frame and extends back of and partly over said wheel, and steering mechanism for said wheel comprising a substantially upright steering post, and a drag link connected to the lower end of said post.

33. In a motorcycle, the combination of a front steering wheel, a frame structure substantially horizontal at approximately the level of the wheel centers, hollow to house the driving mechanism of the motorcycle, and comprising a mud-guard for the front wheel which is a unitary part of said frame structure and extends back of and partly over said wheel.

34. In a motorcycle, the combination of a front steering wheel, a frame substantially horizontal at approximately the level of the wheel centers, a dash-board mud-guard for said wheel which is rigidly connected with the frame and extends back of and partly over said wheel, a steering post mounted in said frame and front mud-guard, and a drag link connected with the lower end of said steering post for giving turning movements to the wheel.

35. In a motorcycle, the combination of a front steering wheel, a frame substantially horizontal at approximately the level of the wheel centers, a dash-board mud-guard for said wheel which is rigidly connected with the frame and extends back of and partly over said wheel, a tubular steering post casing rigidly connected with the frame and with said mud-guard, a steering post in said casing, and a drag link connected with the lower end of the steering post for giving turning movements to the wheel.

36. In a motorcycle, the combination of side frame members, a transverse frame member, a front wheel mud-guard secured to and spanning the space between the side frame members and extending forwardly over the front wheel, and a tubular steering post casing secured to said transverse frame member and mud-guard.

37. A motorcycle comprising, in combination, aligned front and rear wheels and a substantially horizontal frame supported thereon at approximately the level of the wheel centers, the portion of which between the wheels is formed to cover the driving mechanism of the motorcycle and is provided with a horizontal surface and front and rear mud-guards fixed to said frame.

38. A motorcycle comprising, in combination, aligned front and rear wheels, a substantially horizontal frame supported thereon with the top of its middle portion at approximately the level of the wheel centers comprising side frame members spaced wide apart at the front to allow steering movements of the wheel, arranged closer together at the center portion of the machine, and providing a support for the driving mechanism of the motorcycle and converging together toward the portions supported on the rear wheel.

39. A motorcycle comprising, in combination, aligned front and rear wheels, a frame supported thereon and a front wheel mud-guard rigid with said frame.

40. A motorcycle comprising, in combination, aligned front and rear wheels, a substantially horizontal frame supported thereon at approximately the wheel centers, and a front wheel mud-guard rigid with said frame and extending upwardly and forwardly back of and over the front wheel.

41. A motorcycle chassis comprising, in combination, front and rear wheels, a frame supported on the rear wheel, and means for resiliently supporting the frame on the front wheel comprising a substantially horizontal suspension member on which the wheel is mounted to turn for steering upon an axis slightly raked backwardly from the vertical and which is connected with the frame only at points in approximate alignment with the wheel centers, and a front wheel mud-guard rigidly connected with said frame.

42. A motorcycle chassis comprising front and rear wheels, spaced side frame members on opposite sides of said wheels, a front wheel dash-board mud-guard rigidly connected to said frame members, a hollow, upwardly extending member secured to the frame members in front of the rear wheel, a pan secured to the center portion of the frame members at the bottom thereof, the forward end of which is inclined upwardly to the level of the bottom of the frame members, and a top section between the front wheel mud-guard and said hollow member which is removable to give access to the driving mechanism.

43. A motorcycle chassis comprising front and rear wheels, spaced side frame members on opposite sides of said wheels, a front wheel dash-board mud-guard rigidly connected to said frame members, a hollow, upwardly extending member secured to the frame members in front of the rear wheel, a pan secured to the center portion of the frame members at the bottom thereof, the forward end of which is inclined upwardly to the level of the bottom of the frame members, a top section between the front wheel mud-guard and said hollow member which is removable to give access to the driving mechanism, and a closure sheet arranged within the front wheel mud-guard to close the opening into the portion of the frame which houses the driving mechanism.

44. In combination with a motorcycle comprising a frame and a front wheel mud-guard fixed to the frame, a transversely extending member connected to and extending laterally from the mud-guard, and a pair of lamps one on each end of said transverse member.

45. In a motorcycle the combination of a frame at substantially the level of the wheel centers, a front wheel mud guard fixed to the frame, a transverse member connected to and extending laterally from the mud guard, a pair of lamps one on each end of said transverse member and rods extending from said transverse member to the opposite sides of said frame.

46. In combination with the front and rear wheels of a motorcycle, a frame arranged at substantially the level of the wheel centers and having forwardly extending portions lying on opposite sides of said front wheel, a front wheel mud-guard fixed to the frame and extending upwardly and forwardly over the front wheel, and braces connecting the top portion of the mud-guard with the forward portions of said frame.

47. In combination with the front and rear wheels of a motorcycle, a frame arranged at substantially the level of the wheel centers and having forwardly extending portions lying on the opposite sides of said front wheel, a front wheel mud-guard fixed to the frame and extending upwardly and forwardly over the front wheel, and a substantially U-shaped bracing structure the middle portion of which is connected with the mud-guard and the ends anchored to the forward portions of said frame, respectively.

48. A motorcycle frame comprising side frame members channel-shaped in cross section and bowed outwardly at the front, a cross frame member, also channel-shaped, curved and having forwardly projecting ends which form box constructions with the bowed out portions of said side frame members.

49. A motorcycle frame comprising side frame members bowed outwardly at their forward ends, and a curved, transverse frame member having forwardly projecting ends engaged with the bowed out portions of the side frame members.

50. A motorcycle frame comprising side frame members bowed outwardly at their forward ends, a curved transverse frame member having forwardly projecting ends engaged with the bowed-out portions of the side frame members, and diagonal struts connecting the transverse frame member with the side frame members, respectively.

51. A motorcycle frame comprising side frame members bowed outwardly at their forward ends, a curved, transverse frame member having forwardly projecting ends engaged with the bowed-out portions of the side frame members, a steering post, a steering post casing, means for bracing the upper end of said casing to the front mud-guard, and a step member for the lower end of said casing which is secured to the front of the transverse frame member.

52. A motorcycle frame comprising side frame members, housing members to enclose the driving mechanism, and a front wheel mud-guard flared at the bottom and fixed to the side frame members, a closure sheet within said mud-guard to close the opening into the space enclosed by said housing members.

53. A motorcycle frame comprising side frame members, housing members to enclose the driving mechanism, and a front wheel mud-guard flared at the bottom and fixed to the side frame members said housing members comprising, a closure sheet removable to give access to the mechanisms enclosed by said housing members, and a pan supported on the under side of said side frame members having an upwardly sloping front portion.

54. In combination with the rear wheel, rear wheel mud-guard and driving chain of a motorcycle, a frame comprising side frame members, a rear housing member partially enclosing the rear wheel, a brace extending from the mud-guard to one of said side frame members, and a chain guard extending between said rear housing member and brace over said chain.

55. In a motorcycle, the combination of a frame, a front wheel mud-guard fixed to the frame and formed with an opening in the top, a steering post casing extending through said opening and having its lower end fixed to said frame, means for bracing the upper end of the mud-guard, and a soft bushing within the opening in the mud-guard and surrounding said casing.

56. In a motorcycle, the combination of a frame at substantially the level of the wheel centers comprising side frame members, the opposite ends of which are provided with means for mounting the front and rear wheels respectively, a driving mechanism arranged between said frame members, a housing enclosing a porton of said mechanism, and a front wheel mud guard united to said frame members and spread at the back and bottom to the width of said frame at the place of attachment thereto.

57. In a motorcycle, the combination of a frame at substantially the level of the wheel centers comprising side frame members, the opposite ends of which are provided with means for mounting the front and rear wheels respectively, a driving mechanism arranged between said frame members, a housing enclosing a portion of said mechanism, a front wheel mud guard united to said frame members and spread at the back and bottom to the width of said frame at the place of attachment thereto, a substantially vertical steering post, and a steering connection from the lower end of the post to said front wheel.

58. In a motorcycle, the combination of a frame at substantially the level of the wheel centers comprising side frame members, the opposite ends of which are provided with means for mounting the front and rear wheels respectively, a driving mechanism arranged between said frame members, a housing enclosing a portion of said mechanism, and a front wheel mud-guard united to said frame members and spread at the back and bottom to the width of said frame at the place of attachment thereto, said mounting for the front wheel comprising a structure pivoted to, forwardly projecting from, and resiliently engaged with said frame.

59. In a motorcycle, the combination of a frame at substantially the level of the wheel centers comprising side frame members, the opposite ends of which are provided with means for mounting the front and rear wheels respectively, a driving mechanism arranged between said frame members, a housing enclosing a portion of said mechanism, and a front wheel mud-guard united to said frame members and spread at the back and bottom to the width of said frame at the place of attachment thereto, said mounting for the front wheel comprising a structure pivoted to, forwardly projecting from and resiliently engaged with said frame, upon which the wheel is mounted to turn for steering on an axis slightly inclined backwardly from the vertical.

60. In combination with the wheels of a motorcycle, a substantially horizontal frame at approximately the level of the wheel centers, a seat above said frame in front of the rear wheel and a fuel tank on the frame under said seat, said frame, seat and tank being arranged so as to leave a free space above said frame in front of said seat and tank and the seat being provided with a longitudinally extending spring.

61. The combination of claim 60 in which the top of the tank is provided with a filling opening and a cap for closing said opening on which said spring bears.

62. The combination of claim 60 in which the top of the tank is provided with a filling opening and the seat is hinged so that it can be turned back to give access to said filling opening.

63. In combination with the wheels of a motorcycle, a substantially horizontal frame at approximately the level of the wheel centers, a seat above said frame in front of the rear wheel and a fuel tank on the frame under said seat having a filling opening in the top, said frame, seat and tank being arranged so as to leave a free space above said frame in front of said seat and tank and the seat being mounted so that it can be moved from the tank to give access to the filling opening.

64. In combination with the wheels of a motorcycle, a substantially horizontal frame at approximately the level of the wheel centers, a seat above said frame in front of the rear wheel, and a fuel tank on the frame under said seat having a filling opening in the top, said frame, seat and tank being arranged so as to leave a free space above said frame in front of said seat and tank and the seat being hinged at its rear end to the motorcycle so that it can be turned backwardly to give access to the filling opening.

65. In combination with the wheels of a motorcycle, a substantially horizontal frame at approximately the level of the wheel centers comprising members which extend on opposite sides of the wheels and are supported thereon, mud-guards extending upwardly from the frame over said wheels, respectively, a seat attached to the rear wheel mud-guard, and a fuel tank arranged under said seat.

66. The combination of claim 65 in which the top of the tank has a filling opening and the seat is hinged to the rear mud-guard so that it can be raised to give access to said opening.

67. In combination with the wheels of a motorcycle, a substantially horizontal frame at approximately the wheel centers comprising members which extend on opposite sides of the wheels and are supported thereon, mud-guards extending upwardly from said frame and over said wheels, respectively, a seat having a longitudinally extending supporting leaf spring, the rear end of which is attached to said mud-guard, and a fuel tank on said frame under said seat arranged so that said spring bears thereon.

68. The combination of claim 65 in which the seat is arranged on a leaf spring and the top of the fuel tank is formed with a filling opening provided with a cap for closing it upon which the leaf spring bears at a point intermediate its ends.

69. In combination with the rear wheel of a motorcycle, side frame members supported on said rear wheel, a hollow member connected with said side frame members and spanning the space between the same, a fuel tank supported by said hollow member, and a seat arranged over said fuel tank.

70. In combination with the rear wheel of a motorcycle, side frame members supported on said rear wheel, a hollow member arranged in front of said wheel and extending upwardly from and spanning said side frame members, a fuel tank supported on said hollow member, and a seat arranged over said tank and bearing thereon.

71. In combination with the rear wheel of a motorcycle, said frame members supported on said rear wheel, a hollow member arranged forwardly of said rear wheel and connected with said side frame members, a fuel tank on said hollow member, and a seat arranged over said tank and bearing thereon and hinged so as to be capable of being turned back so as to give access to the tank.

72. In combination with the rear wheel of a motorcycle, side frame members supported on said rear wheel, a hollow member arranged forwardly of said rear wheel, connected with and spanning the space between said side frame members and formed with a recess, a fuel tank supported in said recess, and a saddle having a spring adapted to bear on said tank.

73. In a motorcycle, the combination of a frame, a fuel tank mounted on said frame and having a filling opening in the top, a cap to close said opening, a saddle hinged to said frame and extending from said tank, and a spring to support said saddle that bears on said cap.

74. In a motorcycle, the combination of a frame, a fuel tank mounted thereon, a saddle comprising a longitudinally extending leaf spring hinged to the frame at one end and connected to the saddle at the other and adapted to bear at an intermediate point on said fuel tank.

75. In a motorcycle, the combination of a frame, a fuel tank mounted thereon, a saddle comprising a longitudinally extending leaf spring hinged to the frame at its rear end, connected to the saddle at the front end and adapted to bear at an intermediate point on said fuel tank.

76. In a motorcycle, the combination of a frame structure, a fuel tank mounted on a saddle comprising a longitudinally extending leaf spring hinged to the frame at its rear end, connected to the saddle at the front end and adapted to bear at an intermediate point on said fuel tank, and a support for the rear end of the saddle which is hinged to the frame on the same axis as said leaf spring.

77. In a motorcycle having a substantially horizontal frame at approximately the level of the wheel centers, a seat above said frame in front of the rear wheel, and a fuel tank on the frame under said seat, said frame, seat and tank being arranged so as to leave a free space above the frame in front of said seat and tank.

78. In a motorcycle having a substantially horizontal frame at approximately the level of the wheel centers, a seat above said frame in front of the rear wheel provided with a longitudinally extending spring, and a fuel tank on said frame under the seat on which said spring bears intermediate its ends; said seat and tank being arranged so as to leave a free space above the frame in front of the seat and tank.

79. In a motorcycle having a substantially horizontal frame at approximately the level of the wheel centers, a seat above said frame in front of the rear wheel provided with a longitudinally extending spring, a fuel tank on said frame under said seat provided with a filling opening and a cap for closing said opening on which said spring bears; said seat and tank being arranged so as to leave a free space above said frame in front of said seat and tank.

80. In a motorcycle having a substantially horizontal frame at approximately the level of the wheel centers, a seat above said frame in front of the rear wheel provided with a longitudinally extending spring, a fuel tank on said frame under said seat provided with a filling opening and a cap for closing said opening on which said spring bears; said seat and tank being arranged so as to leave a free space above said frame in front of said seat and tank, and the seat being hinged so that it can be turned back to give access to the filling opening of the tank.

81. In a motorcycle having a substantially horizontal frame at approximately the level of the wheel centers, a seat above said frame in front of the rear wheel, a fuel tank on the frame under said seat provided with a filling opening in the top, said frame, seat and tank being arranged so as to leave a free space above the frame in front of said seat and tank and the seat being mounted so that it can be moved from the tank to give access to the filling opening of the tank.

82. In a motorcycle having a substantially horizontal frame at approximately the level of the wheel centers, a seat above said frame in front of the rear wheel, a fuel tank on the frame under said seat having a filling opening in the top, said frame, seat and tank being arranged so as to leave a free space above the frame in front of said seat and tank and the seat being hinged at its rear end to the motorcycle so that it can be turned backwardly to give access to the filling opening of the tank.

83. In a motorcycle having a substantially horizontal frame at approximately the level of the wheel centers comprising members which extend on opposite sides of the rear wheel and are supported thereon, a structure extending upwardly from the frame in front of the rear wheel to provide a mud guard, a seat attached to said mud guard structure, and a fuel tank arranged under said seat.

84. In a motorcycle having a substantially horizontal frame at approximately the level of the wheel centers comprising members which extend on opposite sides of the rear wheel and are supported thereon, a structure extending upwardly from the frame in front of the rear wheel to provide a mud guard, a seat hinged to said mud guard structure, and a fuel tank arranged under said seat having a filling opening in the top.

85. In a motorcycle having a substantially horizontal frame at approximately the level of the wheel centers comprising members which extend on opposite sides of the rear wheel and are supported thereon, a structure extending upwardly from the frame in front of the rear wheel to provide a mud guard, a seat hinged to said mud guard structure, and a fuel tank arranged under the said seat having a filling opening in the top, said seat being provided with a spring which, in the operative position of the seat, bears against the fuel tank.

86. In a motorcycle, side frame members supported on the rear wheel of the motorcycle, a fuel tank, and a hollow member above, attached to and spanning the space between the side frame members and formed to support said fuel tank.

Certificate of Correction.

It is hereby certified that in Letters Patent No. 1,547,157, granted July 21, 1925, upon the application of Carl A. Neracher, of Syracuse, New York, for an improvement in "Motor Cycles," errors appear in the printed specification requiring correction as follows: Page 7, line 14, claim 13, after the compound word "mudguard" insert the words *extending forwardly over the front wheel and;* page 10, line 49, claim 52, after the word "members" insert the words *said housing members comprising,* and lines 50 and 51, strike out the words " within said mud-guard to close the opening into the space" and insert instead *removable to give access to the mechanisms;* same page, line 104, claim 57, after the word "thereto" insert the words *and extending forwardly over the front wheel;* and that the said Letters Patent should be read with these corrections therein that the same may conform to the record of the case in the Patent Office.

Signed and sealed this 15th day of December, A. D. 1925.

[SEAL.]

WM. A. KINNAN,
*Acting Commissioner of Patents.*